UNITED STATES PATENT OFFICE.

CHARLES J. SEVIN, OF NEW YORK, N. Y.

IMPROVEMENT IN PAINT COMPOUNDS.

Specification forming part of Letters Patent No. 149,074, dated March 31, 1874; application filed November 8, 1873.

*To all whom it may concern:*

Be it known that I, CHARLES JULIUS SEVIN, of the city, county, and State of New York, have invented a new and Improved Paint, to be applied to wood, metal, paper, cloth, felt, or other substance; and I do hereby declare that the following is a full and exact description thereof.

The nature of my invention consists in mixing and commingling certain ingredients so as to produce a water-proof and fire-proof paint of great durability, hardness, flexibility, and toughness.

To enable others skilled in the art to make and use my invention, I will proceed to describe the method of preparing the paint.

First, I heat six pounds of linseed-oil until it boils. I then gradually add to the boiling oil one ounce of litharge, one ounce of sugar of lead, and one-half ounce of oxide of manganese. I then boil the mixture so produced two hours, and then let it cool, and then strain it. I then mix the ingredients in the following proportions: Second, I take eighteen (18) pounds of zinc-white powder, and add to it two pounds of spirits of turpentine, and mix thoroughly. I then add, gradually, two pounds of cyankalium, the linseed-oil prepared as above set forth, eighteen pounds of chalk, eight pounds of yellow ocher, two pounds of cobalt-blue, two pounds of pulverized sulphur, two pounds of litharge, two pounds of water-glass, and thirty-eight pounds of pulverized iron filings.

This produces a paint of a neutral hue. In order to produce a paint of any desired color, add to the foregoing composition such coloring matter as is usually used to produce such desired color.

What I claim as my invention, and desire to secure by Letters Patent, is—

A paint composed of ingredients substantially as above set forth.

CHARLES JULIUS SEVIN.

Witnesses:
G. L. SIMONSON,
E. P. BREED.